US011881893B2

(12) United States Patent
Hara et al.

(10) Patent No.: US 11,881,893 B2
(45) Date of Patent: Jan. 23, 2024

(54) OPTICAL COMMUNICATION SYSTEM AND DISPERSION COMPENSATION METHOD

(71) Applicant: NIPPON TELEGRAPH AND TELEPHONE CORPORATION, Tokyo (JP)

(72) Inventors: Kazutaka Hara, Musashino (JP); Yasutaka Kimura, Musashino (JP); Atsuko Kawakita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/798,295

(22) PCT Filed: Feb. 12, 2020

(86) PCT No.: PCT/JP2020/005334
§ 371 (c)(1),
(2) Date: Aug. 8, 2022

(87) PCT Pub. No.: WO2021/161415
PCT Pub. Date: Aug. 19, 2021

(65) Prior Publication Data
US 2023/0074152 A1 Mar. 9, 2023

(51) Int. Cl.
*H04J 14/00* (2006.01)
*H04B 10/2507* (2013.01)
(Continued)

(52) U.S. Cl.
CPC . *H04B 10/25073* (2013.01); *H04B 10/25891* (2020.05); *H04J 14/0204* (2013.01); *H04J 14/0252* (2013.01)

(58) Field of Classification Search
CPC .......... H04B 10/2057; H04B 10/25073; H04B 10/27; H04B 10/40; H04B 10/2513;
(Continued)

(56) References Cited

U.S. PATENT DOCUMENTS 7,236,708 B2* 6/2007 Shimada ............. H04B 10/272
398/79
8,744,265 B2* 6/2014 Effenberger ......... H04B 10/272
398/79
(Continued)

FOREIGN PATENT DOCUMENTS

JP 3819264 B2 9/2006
JP 2006304170 A 11/2006
(Continued)

OTHER PUBLICATIONS

G. E. R. de Paiva et al., 80km Extended Gigabit Passive Optical Network, 2011 SBMO/IEEE MTT-S International Microwave and Optoelectronics Conference (IMOC 2011), Oct. 29, 2011, pp. 35-39.

(Continued)

*Primary Examiner* — Hanh Phan
(74) *Attorney, Agent, or Firm* — Harness, Dickey & Pierce, P.L.C.

(57) ABSTRACT

An optical communication system according to the present invention cancels waveform distortion due to wavelength dispersion by extracting the spectrum of a transmitted optical signal and passing the optical signal to a fiber having a dispersion value opposite to a dispersion amount corresponding to a transmission distance received by the spectrum component and compensates for a transmission path loss due to the fiber having the opposite dispersion value using optical splitters having different split ratios. With this configuration, the present invention can compensate for waveform distortion due to wavelength dispersion by a simple method in an access network and achieve an increase in the reachable transmission distance of the farthest user or an increase in the number of connectable users.

14 Claims, 9 Drawing Sheets

(51) Int. Cl.
*H04B 10/25* (2013.01)
*H04J 14/02* (2006.01)

(58) Field of Classification Search
CPC ......... H04B 10/25133; H04B 10/25891; H04J 14/02; H04J 14/0204; H04J 14/0252; H04J 14/0216
USPC ... 398/147, 148, 81, 79, 135, 136, 158, 159, 398/66, 67, 68, 69, 70, 71, 72, 33, 38
See application file for complete search history.

(56) References Cited

U.S. PATENT DOCUMENTS

| | | | |
|---|---|---|---|
| 9,025,955 B2* | 5/2015 | Onaka | ................ H04B 10/2914 398/67 |
| 2002/0097969 A1 | 7/2002 | Aikawa et al. | |
| 2006/0098988 A1 | 5/2006 | Sekiya et al. | |
| 2008/0056714 A1 | 3/2008 | Konstan | |
| 2019/0036609 A1* | 1/2019 | Liu | ........................ H04B 10/27 |

FOREIGN PATENT DOCUMENTS

| | | |
|---|---|---|
| JP | 2008504765 A | 2/2008 |
| JP | 4810083 B2 | 11/2011 |
| JP | 5359412 B2 | 12/2013 |
| JP | 6586840 B2 | 10/2019 |

OTHER PUBLICATIONS

Atsuko Kawakita et al., Long-Reach Optical Access Networks by Splitting Ratio Determination Process with Unsymmetrical Optical Splitter, Proceedings of the 2018 Communication Society Conference of the Society of Electronic Information and Communication 2, Aug. 28, 2018.

* cited by examiner

OPTICAL COMMUNICATION SYSTEM AND DISPERSION COMPENSATION METHOD

CROSS-REFERENCE TO RELATED APPLICATIONS

This application is a 371 U.S. National Phase of International Application No. PCT/JP2020/005334, filed on Feb. 12, 2020. The entire disclosure of the above application is incorporated herein by reference.

TECHNICAL FIELD

The present disclosure relates to an optical communication system and a dispersion compensation method for compensating for waveform distortion due to wavelength dispersion of a transmitted optical signal.

BACKGROUND ART

With the explosive spread of the Internet, the number of subscribers to FTTH (Fiber to the home), which provides high-speed communication services, is increasing. In the current FTTH service, 1G-EPON (gigabit-Ethernet passive optical network) with a communication speed of 1 Gbit/s is used. However, in the future, the number of subscribers will increase due to the further spread of the Internet, and further widening of the bandwidth is required for application to the backhaul line of the 5th generation mobile communication system and IoT (Internet of Things), and supporting 4K/8K high-definition video distribution services. Currently, in response to these requirements, 10G-EPON which has already been standardized, 40 Gbit/s class PON (ITU-T Rec G.989 series), and 50 Gbit/s class next-generation PON system (IEEE802.3ca) are being actively discussed by standardization organizations such as IEEE and ITU.

Generally, in FTTH services, a TDM-PON system based on time division multiplexing (TDM) as a multiplexing technology and a double star type as a network topology has been introduced to efficiently and economically accommodate subscribers who are deployed in a plane. In recent years, a reduction of equipment cost per user and a technology for extending the reach of an access network according to a power reduction by station integration have been desired.

The following two factors are examples of factors that hinder extension of the reach of optical communication systems.

(A) Attenuation of light intensity, and
(B) Waveform distortion due to wavelength dispersion The simplest approach to the factor (A) is a method of recovering the attenuated light using a semiconductor optical amplifier (SOA) or a rare earth-added optical fiber amplifier. For example, NPL 1 realizes a long reach distance of 80 km and a high split ratio of 128 using SOA. However, both SOA and rare earth-added optical fiber amplifiers require a current source because they directly amplify optical signals based on stimulated emission, which may lead to a decrease in MTBF (Mean Time Between Failures) of the entire system due to the securing of a power source and the use of active elements.

On the other hand, the factor (B) can also be solved by the dispersion compensation technology. The dispersion compensation technology can be roughly classified into two types including optical region dispersion compensation that compensates the transmitted signal in the optical region and electrical region dispersion compensation that receives the transmitted signal using $P_D$ (Photo-Diode) and compensates the baseband signal by electrical signal processing.

Examples of the optical region dispersion compensation technology mainly include a method using DCF (Dispersion Compensation Fiber), a method using FBG (Fiber Braff Grating), and a method using VIPA (Virtually Imaged Phased Array) (for example, see PTLs 1 to 3).

The electrical region dispersion compensation technology uses an FIR (Finite Impulse Response) filter that converts the current photoelectrically converted by $P_D$ into a voltage signal via TIA (Trans-Impedance Amplifier), adds a delay each time the signal is tapped, and weights a tap coefficient for each signal, and outputs a total sum. For example, PTL 4 discloses one including a feedforward equalizer using an FIR filter and a decision feedback equalizer that filters a signal subjected to threshold decision by a decision circuit and then feeds back the filtering result.

The influence of waveform distortion due to dispersion differs depending on the type of LD (Laser-Diode) of the transmitter used and the wavelength band used. Regarding the type of LD, since DFB (Distributed FeedBack)-LD oscillates in a single mode due to the diffraction grating, this LD is not easily affected by dispersion. In contrast, since FP (Fabry-Perot)-LD oscillates at multiple wavelengths, the influence of dispersion, that is, the waveform distortion, appears remarkably. Regarding the wavelength band used, the wavelength side longer than the zero-dispersion wavelength (about 1.31 μm) of SMF (Single Mode Fiber), which is mainly used in optical communication systems, is called an anomalous dispersion region, and optical transmission in this region results in waveform distortion due to wavelength dispersion.

CITATION LIST

Patent Literature

[PTL 1] Japanese Patent No. 3819264
[PTL 2] Japanese Patent No. 5359412
[PTL 3] Japanese Patent No. 4810083
[PTL 4] Japanese Patent No. 6586840

Non Patent Literature

[NPL 1] G. E. R. de Paiva, M. M. Freire, U. R. Duarte, A. B. Sassi, A. C. Bizetti, J. F. Pozzuto, J. B. Rosolem, "80 km Extended Gigabit Passive Optical Network", Microwave & Optoelectronics Conference (IMOC) on Publication Year: 2011, Page(s): 35-39

SUMMARY OF THE INVENTION

Technical Problem

In an access network, as described above, it is important to economically realize FTTH, and there is a possibility that an inexpensive FP-LD is mounted as the LD. Further, in the conventional techniques, it is difficult to compensate for dispersion when the wavelength range is defined over 100 nm of 1260 nm to 1360 nm (partly, waveform distortion occurs due to the influence of wavelength dispersion due to transmission in an anomalous dispersion region) like an uplink signal of a GE-PON system (Gigabit Ethernet-Passive Optical Network).

Even if it can be compensated, when an optical signal loss occurs in the optical region dispersion compensation technology and the transmission distance between OLT (Optical Line Terminal) and ONU (Optical Network Unit) increases due to station integration, and the like, there is a possibility that the service that was being provided may be interrupted. The electrical region dispersion compensation technology requires an electric dispersion compensation circuit corresponding to a burst signal, and there is a possibility that it is not possible to cope with the high technical difficulty and the increase in the transmission rate.

As described above, in the optical communication system, there is a new problem that it is difficult to avoid a decrease in MTBF when trying to eliminate the factor (A), and it is difficult to eliminate the factor (B) when an inexpensive FP-LD is used.

Therefore, in order to solve the above problems, an object of the present invention is to provide an optical communication system and a dispersion compensation method capable of eliminating the factor (A) while avoiding a decrease in MTBF and eliminating the factor (B) even if an inexpensive FP-LD is used.

Means for Solving the Problem

In order to achieve the above object, the optical communication system and the dispersion compensation method according to the present invention connect a dispersion compensation module composed of passive components to the OLT side or the ONU side of a transmission optical fiber in which dispersion is to be compensated.

Specifically, an optical communication system according to the present invention is an optical communication system including a dispersion compensation module, the dispersion compensation module includes a dispersion compensation optical fiber and an asymmetrical optical splitter, wherein the dispersion compensation optical fiber has a negative dispersion value in an anomalous dispersion region corresponding to a longer wavelength side than a zero-dispersion wavelength of a transmission optical fiber disposed between an OLT (Optical Line Terminal) and an ONU (Optical Network Unit), the asymmetrical optical splitter includes: one merge port to which the dispersion compensation optical fiber is connected; N split ports (N is an integer of 2 or more) to which an optical network including one or a plurality of the ONUs is connected; and N−1 split portions that split light from two first ports on the merge port side to two second ports on the split port side at a predetermined split ratio, the split portions are connected so that one of the second ports is connected to one of the split ports and the other of the second ports is connected to one of the first ports of the split portion of a next stage, and the split portion of a first stage of the split portions has one of the first ports connected to the merge port, and the split portion of a final stage has the second ports connected to the split port.

A dispersion compensation method according to the present invention is a dispersion compensation method for compensating for wavelength dispersion of a transmission optical fiber disposed between an OLT (Optical Line Terminal) and an ONU (Optical Network Unit), including: connecting a dispersion compensation module to the OLT side or the ONU side of the transmission optical fiber, wherein the dispersion compensation module includes a dispersion compensation optical fiber and an asymmetrical optical splitter, the dispersion compensation optical fiber has a negative dispersion value in an anomalous dispersion region corresponding to a longer wavelength side than a zero-dispersion wavelength of a transmission optical fiber, the asymmetrical optical splitter includes: one merge port to which the dispersion compensation optical fiber is connected; N split ports (N is an integer of 2 or more) to which an optical network including one or a plurality of the ONUs is connected; and N−1 split portions that split light from two first ports on the merge port side to two second ports on the split port side at a predetermined split ratio, the split portions are connected so that one of the second ports is connected to one of the split ports and the other of the second ports is connected to one of the first ports of the split portion of a next stage, and the split portion of a first stage of the split portions has one of the first ports connected to the merge port, and the split portion of a final stage has the second ports connected to the split port.

This optical communication system cancels waveform distortion due to wavelength dispersion using a dispersion compensation optical fiber having a dispersion value opposite to a dispersion amount corresponding to a transmission distance received by the spectrum component of the transmitted optical signal. That is, this optical communication system can eliminate the factor (B) even if the FP-LD is used. Further, this optical communication system compensates for the transmission path loss corresponding to the dispersion compensation optical fiber using asymmetrical optical splitters having different split configurations or split ratios. That is, since this optical communication system does not use an active element, the factor (A) can be eliminated while avoiding a decrease in MTBF.

Therefore, the present invention provides an optical communication system and a dispersion compensation method capable of eliminating the factor (A) while avoiding a decrease in MTBF and eliminating the factor (B) even if an inexpensive FP-LD is used.

In this optical communication system, the OLT may be connected to the merge port of the asymmetrical optical splitter, one terminal of the transmission optical fiber may be connected to the split port to which one of the second ports of the split portion of the first stage of the split ports of the asymmetrical optical splitter is connected, and the other terminal of the transmission optical fiber may be connected to the optical network.

In this case, the optical communication system may further include a spectrum monitor connected to the other first port of the split portion of the first stage to observe a spectrum of an uplink signal from the ONU.

In this optical communication system, the OLT may be connected to the merge port of the asymmetrical optical splitter via the transmission optical fiber, and the optical network may be connected to the split port to which one of the second ports of the split portion of the first stage of the split ports of the asymmetrical optical splitter is connected.

Effects of the Invention

The present invention can provide an optical communication system and a dispersion compensation method capable of eliminating the factor (A) while avoiding a decrease in MTBF and eliminating the factor (B) even if an inexpensive FP-LD is used.

DESCRIPTION OF EMBODIMENTS

Figure 1:
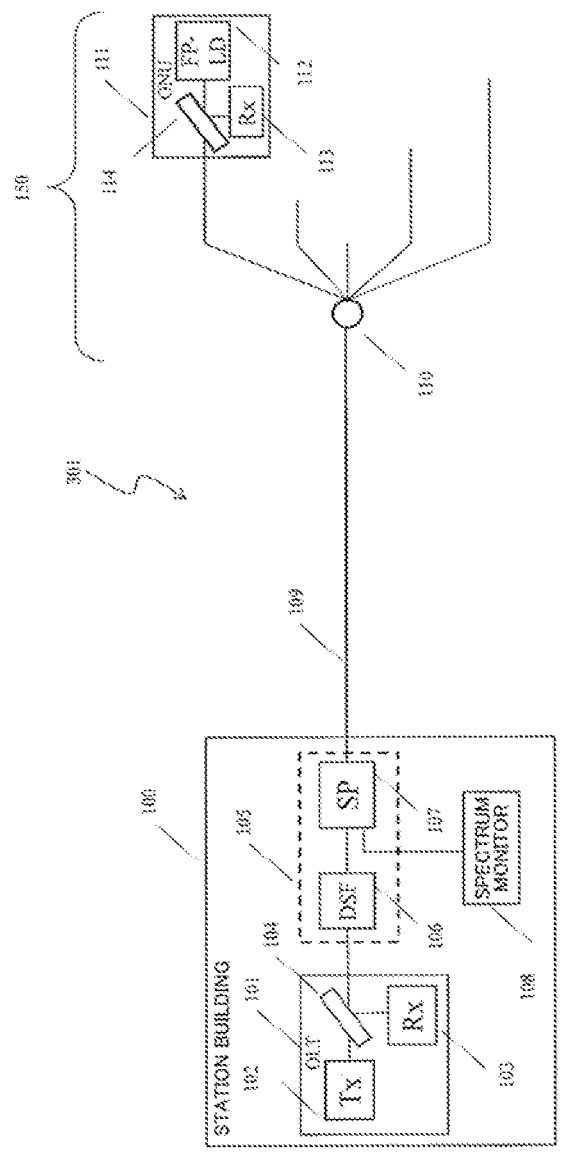
FIG. 1 is a diagram illustrating an optical communication system according to the present invention.

Embodiments of the present invention will be described with reference to the accompanying drawings. The embodiments described below are examples of the present invention, and the present invention is not limited to the following embodiments. In addition, the components having the same reference numerals in the present specification and the drawings indicate the same components.

First Embodiment

FIG. 1 is a diagram illustrating an optical communication system 301 of the present embodiment. The optical communication system 301 includes a dispersion compensation module 105. The dispersion compensation module 105 includes a dispersion compensation optical fiber 106 and an asymmetrical optical splitter 107.

The dispersion compensation optical fiber 106 has a negative dispersion value in an anomalous dispersion region corresponding to a longer wavelength side than the zero-dispersion wavelength of a transmission optical fiber 109 arranged between an OLT 101 and an ONU 111.

Figure 8:
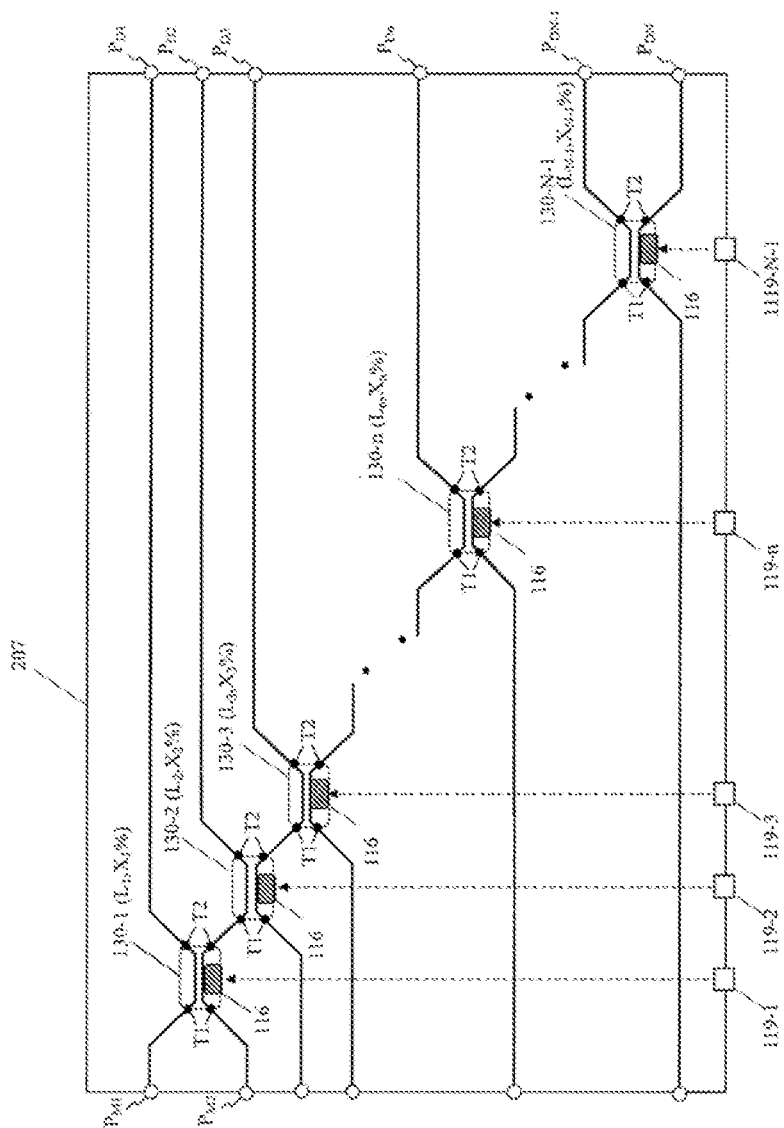
FIG. 8 is a diagram illustrating an asymmetrical optical splitter of an optical communication system according to the present invention.

The structure of an asymmetrical optical splitter is shown in FIG. 8.

The asymmetrical optical splitter 207 includes one merge port $P_{M1}$ to which the dispersion compensation optical fiber 106 is connected, N (N is an integer of 2 or more) split port $P_{Dn}$ (n is an integer of 1 or more and N or less) to which an optical network 150 including one or a plurality of ONUs 111 is connected, and N−1 split portions 130 that split light from two first ports T1 on the merge port $P_{M1}$ side to two second ports T2 on the split port $P_{Dn}$ side at a predetermined split ratio. The split portion 130 connects one of the second ports T2 to any one of the split ports $P_{Dn}$, and connects the other of the second port T2 to one of the first ports T1 of the split portion 130 of the next stage. A split portion 130-1 of the first stage of the split portion 130 connects one of the first ports T1 to the merge port $P_{M1}$, and a split portion 130-N−1 of the final stage connects the second ports T2 to split ports ($P_{DN-1}$, $P_{DN}$), respectively.

Further, each of the split portions 130 may include a communication terminal 119 to which an instruction from the outside is input, and a variable mechanism 116 that changes a split ratio of light from the first port T1 to the respective second ports T2 according to the signal input to the communication terminal 119. Each of the variable mechanisms 116 varies the split ratios ($X_1$ to $X_{N-1}$) of the split portions (130-1 to 130-N−1) by changing the distances ($L_1$ to $L_{1-N}$) between two waveguides. The asymmetrical optical splitter 207 can update the split ratio afterwards.

In the present embodiment, for the sake of simplicity, the asymmetrical optical splitter 107 with N=4 in FIG. 2 will be described.

In the optical communication system 301, the OLT 101 is connected to the merge port $P_{M1}$ of the asymmetrical optical splitter 107, one terminal of the transmission optical fiber 109 is connected to the split port $P_{D1}$ to which one of the second ports T2 of the split portion 130-1 of the first stage of the split port $P_{Dn}$ of the asymmetrical optical splitter 107 is connected, and the other terminal of the transmission optical fiber 109 is connected to the optical network 150.

The optical communication system 301 further includes a spectrum monitor 108 which is connected to the other first port T1 of the split portion 130-1 of the first stage to observe the spectrum of an uplink signal from the ONU 111.

The optical communication system 301 is a double-star type PON system, and is different from the conventional PON system in that it includes the dispersion compensation module 105 and the spectrum monitor 108 for monitoring the spectrum of the uplink signal from the ONU. The dispersion compensation module 105 includes the optical fiber 106 having a negative dispersion value in an anomalous dispersion region on the longer wavelength side than the zero-dispersion wavelength of the transmission optical fiber 109, and the asymmetrical optical splitter 107 having a split ratio for alleviating the transmission path loss of the optical fiber 106. The transmission optical fiber 109 is a single mode optical fiber (SMF).

The optical splitter is roughly classified into a fiber-type optical splitter in which a plurality of optical fiber cores are fusion-stretched so that the light confinement effect in the core is weakened and light is coupled to adjacent fibers, and a waveguide-type optical splitter in which an optical circuit is formed using the semiconductor process technology such as photolithography on a quartz glass, a silicon substrate, or the like. In the present embodiment, in order to help understanding of the invention, the optical fiber-type 4-split asymmetrical optical splitter 107 in which the asymmetric structure as shown in FIG. 2 is uniquely determined is used.

The split ratios of the split portions (130-1, 130-2, 130-3) of the asymmetrical optical splitter 107 are X %, Y %, and Z %, respectively.

In FIG. 1, 100 indicates a communication station building, 101 indicates an OLT (Optical Line Terminal) installed in the communication station building 100, 102 indicates an optical transmitter that transmits downlink signals, 103 indicates an optical receiver that receives uplink signals, 104 indicates a transmission/reception separation filter for realizing single-core bidirectional communication, 109 indicates a transmission optical fiber, 110 indicates an N-split symmetrical optical splitter, 111 indicates an ONU (Optical Network Unit) installed in the user's house, 112 indicates an optical transmitter (LD is a Fabry-Perot-LD) that transmits uplink signals, 113 indicates an optical receiver that receives downlink signals, and 114 indicates a transmission/reception separation filter for realizing single-core bidirectional communication.

In FIG. 1, the optical network 150 has a configuration in which the ONU 111 and the transmission optical fiber 109 are connected via the symmetrical optical splitter 110, but the ONU 111 may be directly connected to the transmission optical fiber 109.

Hereinafter, a dispersion compensation method will be described.

Figure 3:
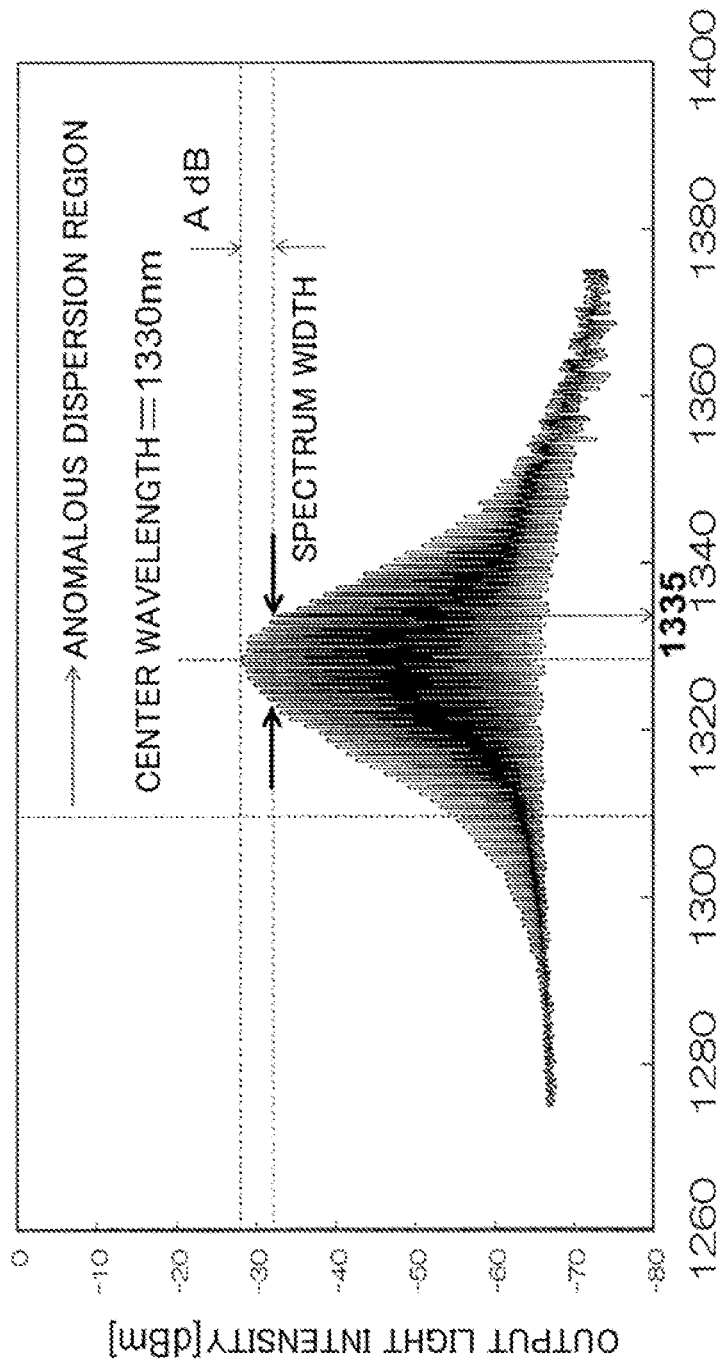
FIG. 3 is a diagram illustrating an observation waveform on a spectrum monitor.

FIG. 3 shows an oscillation spectrum of a typical FP-LD, and it can be seen that it oscillates at a plurality of wavelengths over several tens of nm. The spectrum shown in FIG.

3 can be observed when the uplink signal from the FP-LD112 is passed to the N-split symmetrical optical splitter 110 and the transmission optical fiber 109 and the uplink signal from a specific port (for example, the port $P_{M2}$ in FIG. 2) of the asymmetrical optical splitter 107 is observed by the spectrum monitor 108. Examples of the spectrum monitor include a spectrum analyzer.

Figure 4:
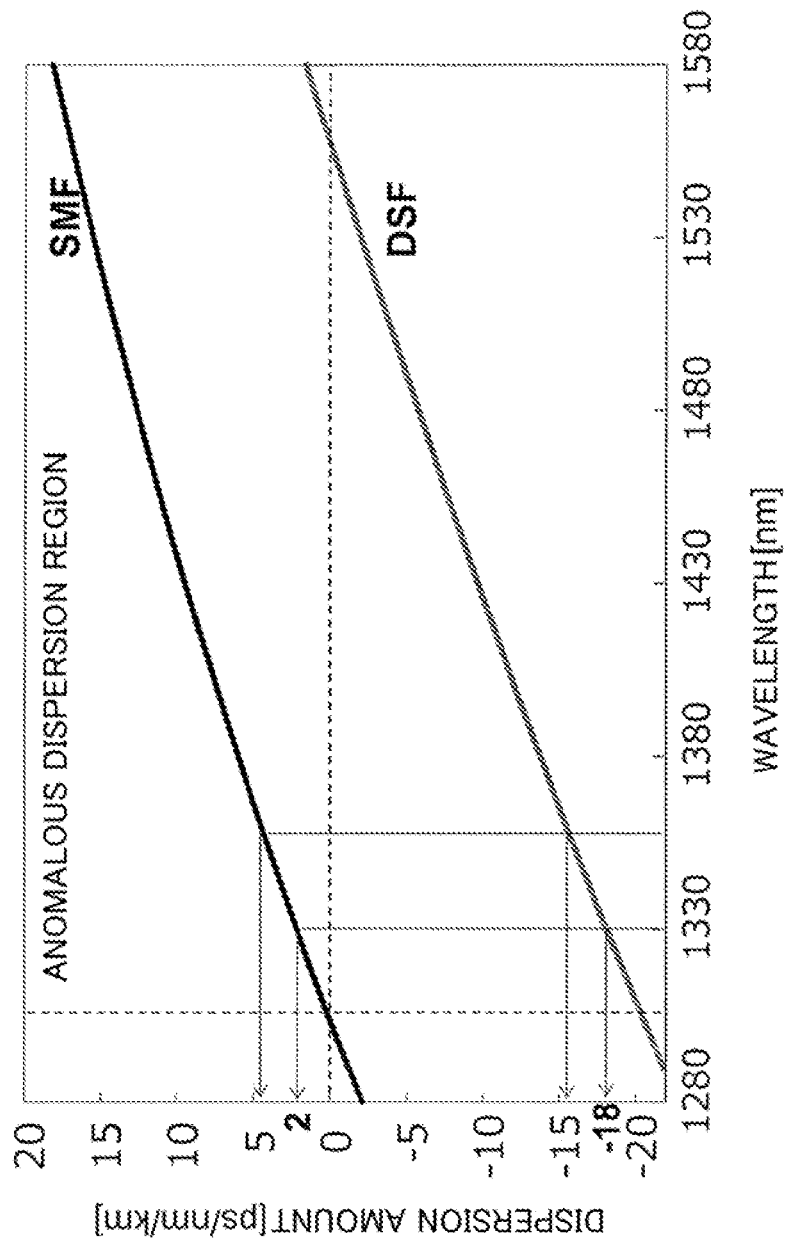
FIG. 4 is a diagram illustrating dispersion curves of SMF and DSF.

Further, FIG. 4 is a diagram illustrating the wavelength dependence of the dispersion amount of the transmission optical fiber 109 which is SMF and the wavelength dependence of the dispersion amount of the optical fiber 106 (in FIG. 4, a dispersion-shifted fiber: DSF) having a negative dispersion value in an anomalous dispersion region on the longer wavelength side than the zero-dispersion wavelength of the SMF. When the result of the analysis of the spectrum monitor 108 shows that the center wavelength is 1330 nm as shown in FIG. 3, the amount of dispersion received by transmission per 1 km of SMF is determined from the dispersion curve of FIG. 4 (here, 2 [ps/nm/km]). The connected ONU and OLT can calculate the transmission distance from the RTT (Round Trip Time) using the range function of the PON, and the amount of dispersion received when the uplink signal from the ONU 111 arrives at the OLT can be calculated. For example, when the distance between the OLT and the ONU 111 is 18 km, the amount of dispersion received by the uplink signal of the ONU 111 when arriving at the OLT is uniquely determined as 2 [ps/nm/km]×18 [km]=+36 [ps/nm].

Next, since the optical fiber 106 (dispersion-shifted fiber: DSF in FIG. 4) having a negative dispersion value in the anomalous dispersion region on the longer wavelength side than the zero-dispersion wavelength of the SMF has a dispersion amount of −18 [ps/nm/km] at 1330 nm from FIG. 4, when a DSF of 2 km is prepared, a dispersion amount of −18 [ps/nm/km]×2 [km]=−36 [ps/nm] is obtained.

In the above description, the dispersion compensation method for the center wavelength analyzed by the spectrum monitor has been performed. However, as shown in FIG. 3, the same applies even when the output light intensity that is A dB smaller from the peak of the light intensity at the center wavelength is defined, and the range of the light intensity or more is defined as the spectrum width. In this case, the optical fiber 106 having a dispersion amount opposite to the dispersion amount received by the transmission optical fiber 109 with respect to the spectrum on the long wavelength side (1335 nm in FIG. 3) may be calculated by the method described above. In this way, by extracting the spectrum of the transmitted optical signal and passing the optical signal through an optical fiber having a dispersion value opposite to the dispersion amount corresponding to the transmission distance received by the spectrum component, the waveform distortion due to wavelength dispersion can be cancelled by a simple method.

However, in this case, a transmission path loss will occur since the optical signal passes through the optical fiber 106 (in FIG. 4, dispersion-shifted fiber: DSF) having a negative dispersion value in the anomalous dispersion region corresponding to the longer wavelength side than the zero-dispersion wavelength of SMF. In order to compensate for this transmission path loss, the optical communication system 301 uses the asymmetrical optical splitter 107.

Figure 9:
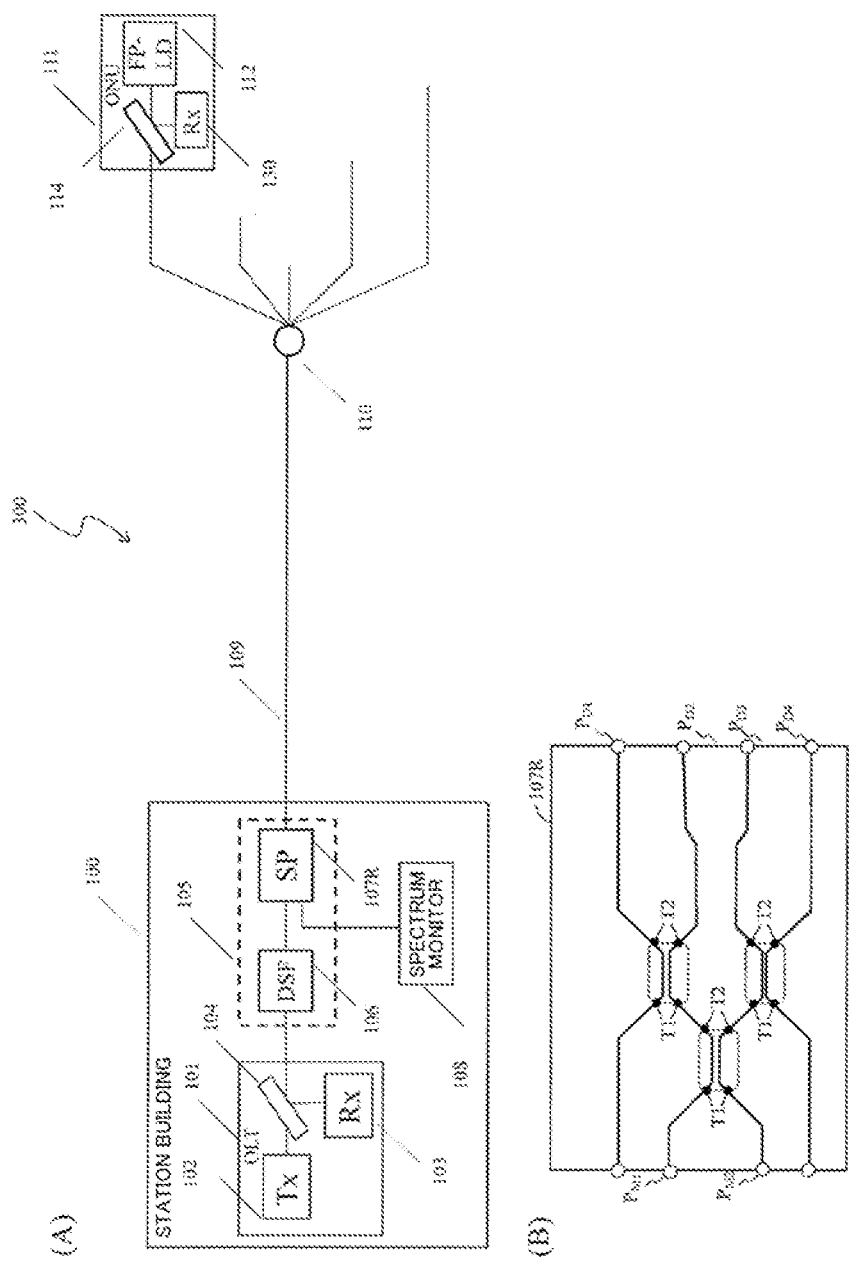
FIG. 9 is a diagram illustrating a related optical communication system.

Generally, an optical splitter used in a passive double-star PON system is a symmetrical optical splitter with a split ratio of 50%. FIG. 9(A) is a diagram illustrating an optical communication system 300 including a general symmetrical optical splitter (4-split) 107R. FIG. 9(B) is a diagram illustrating the symmetrical optical splitter 107R. The symmetrical optical splitter 107R connects the split portion 130 having a split ratio of 50% as shown in FIG. 9(B). The split loss (split loss from the merge port $P_{M1}$ to the split port $P_{D1}$) of the symmetrical optical splitter 107R is about 7.5 dB.

Figure 2:
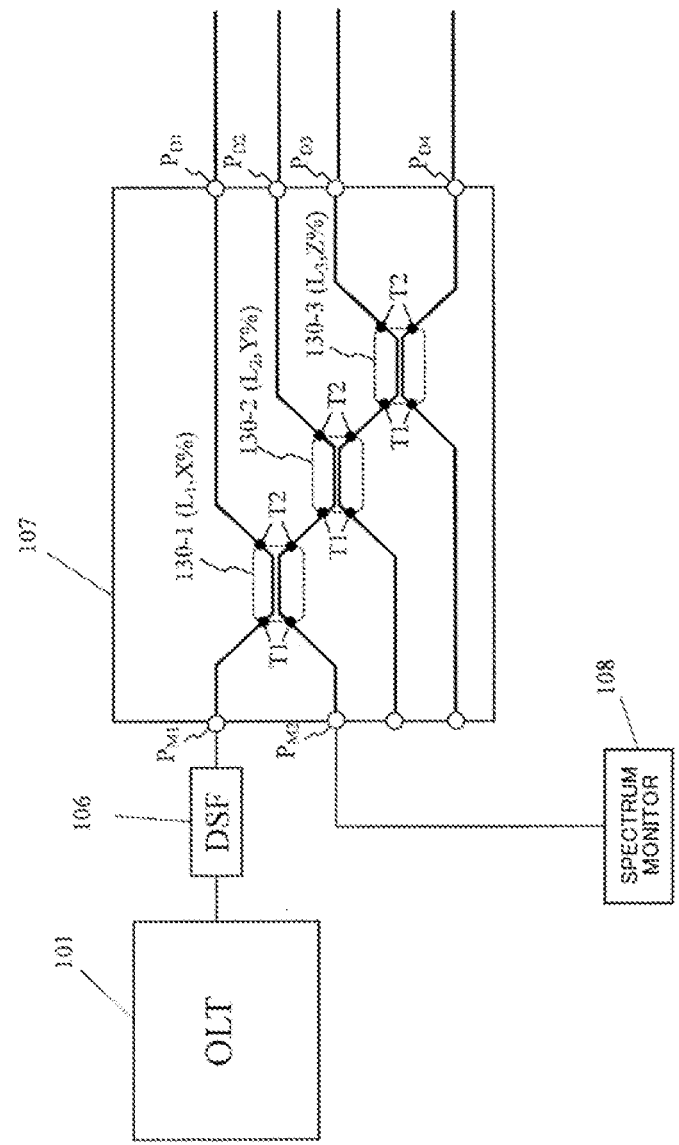
FIG. 2 is a diagram illustrating an asymmetrical optical splitter of an optical communication system according to the present invention.

On the other hand, when the split ratio of the asymmetrical optical splitter 107 shown in FIG. 2 is X=60%, the split loss from the merge port $P_{M1}$ to the split port $P_{D1}$ is about 2.5 dB. In this way, using a specific port of the asymmetrical splitter (in the case of the asymmetrical optical splitter 107, the merge port $P_{M1}$ and the split port $P_{D1}$), a split loss of about 5 dB can be improved from the symmetrical optical splitter 107R.

Since the transmission path loss of the dispersion compensation optical fiber (DSF) 106 in the wavelength band is about 0.5 dB/km, the transmission path loss received by the DSF transmission of 2 km is about 0.5 [dB/km]×2 [km]=1 dB. Therefore, the transmission loss can be canceled by the improvement of the split loss caused by replacing the optical splitter from the symmetrical optical splitter 107R to the asymmetrical optical splitter 107. The length of the transmission optical fiber 109 can be extended by the remaining split loss improvement (5 dB−1 dB=4 dB).

In this way, the optical transmission system 301 can cancel waveform distortion due to wavelength dispersion by extracting the spectrum of a transmitted optical signal and passing the optical signal through an optical fiber having a dispersion value opposite to a dispersion amount corresponding to a transmission distance received by the spectrum component and cancel a transmission path loss corresponding to the optical fiber by arranging optical splitters which are passive components and have different split configurations and different split ratios.

Second Embodiment

Figure 5:
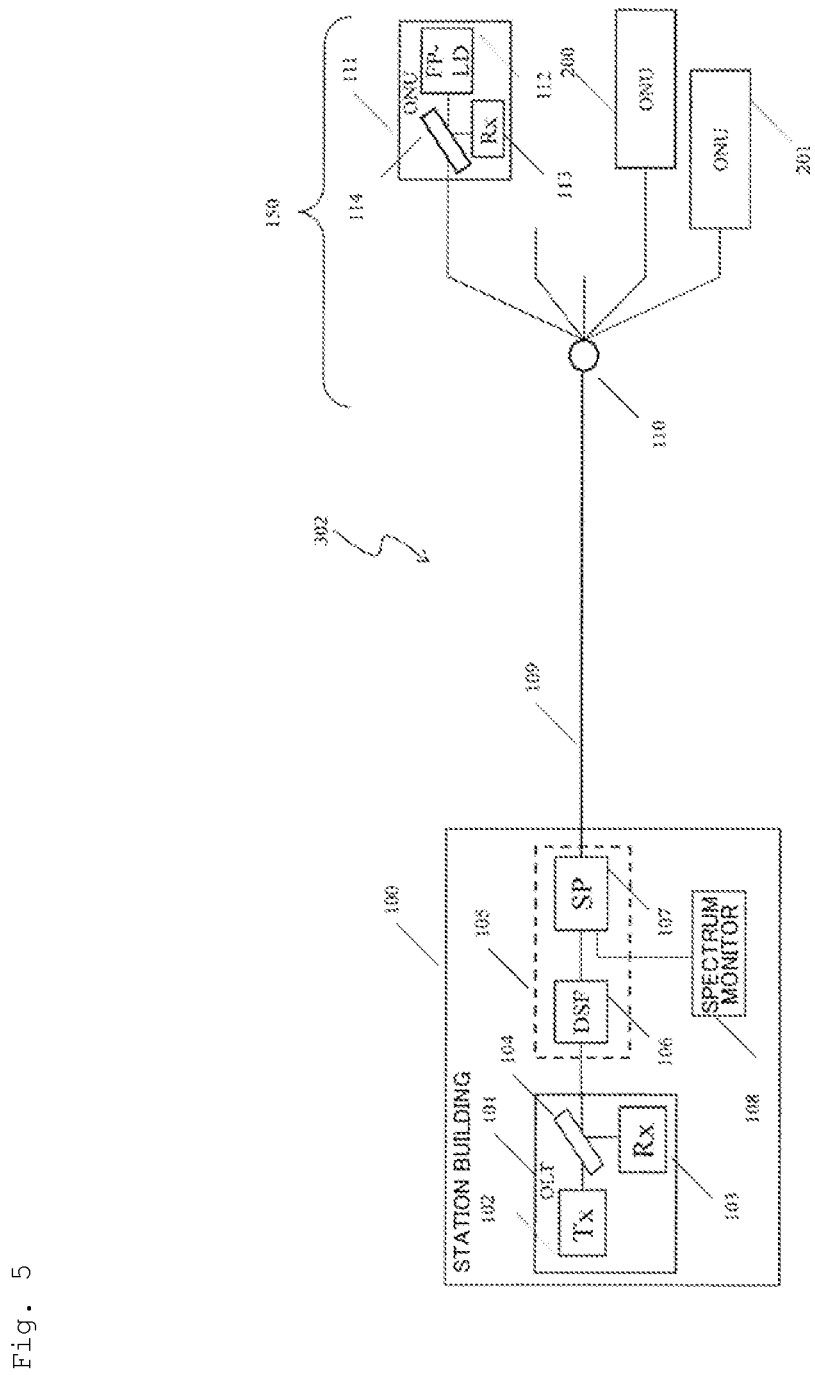
FIG. 5 is a diagram illustrating an optical communication system according to the present invention.

FIG. 5 is a diagram illustrating an optical communication system 302 of the present embodiment. The difference between the optical communication system 302 and the optical communication system 301 of FIG. 1 is that a plurality of ONUs (111, 200, and 201) is connected under an N-split symmetrical optical splitter 110 in an optical network 150. In a PON system, the oscillation wavelengths (frequencies) of ONUs operate asynchronously, and each ONU oscillates within a specified wavelength range (for example, 1260 nm to 1360 nm in the IEEE802.3 standard, which is the standard of the GE-PON system). A multiplexing method called TDMA (Time-Division Multiple Access) is adopted for the uplink signal of the PON, and the transmission time is controlled on the OLT side so that the signals from each ONU do not collide at the time of merging in the splitter.

Figure 6:
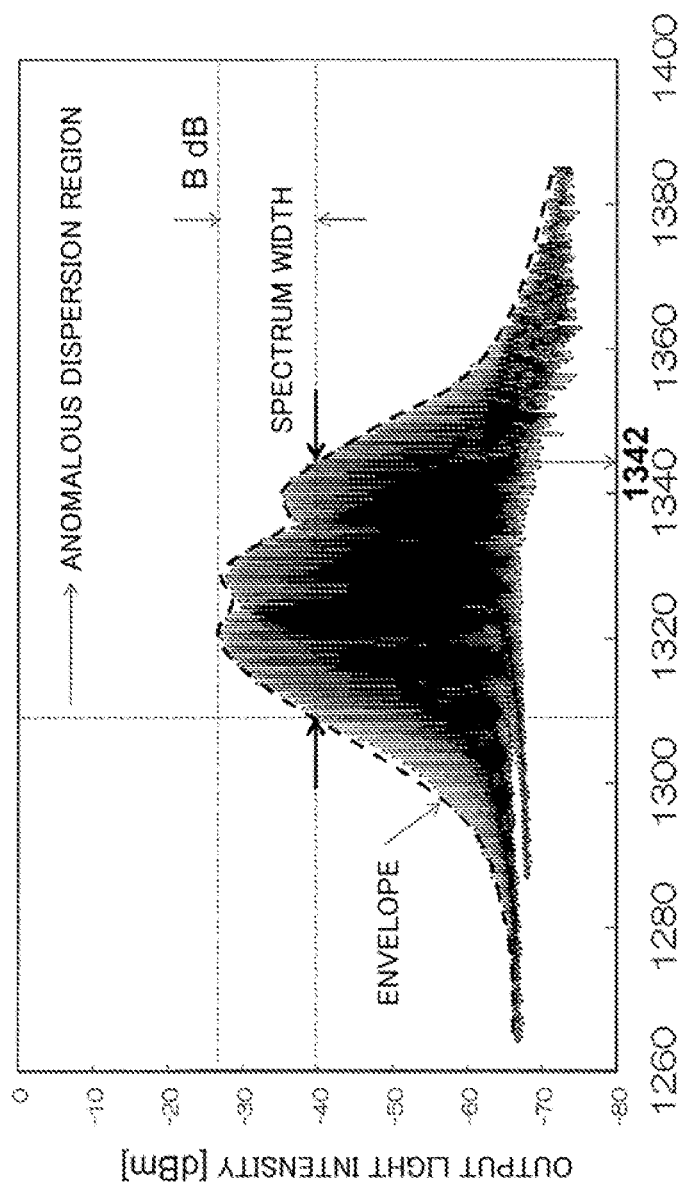
FIG. 6 is a diagram illustrating an observation waveform on a spectrum monitor.

When the uplink signal from each ONU is observed by the spectrum monitor 108 via the asymmetrical optical splitter 107, the uplink signal is displayed as a plurality of superimposed spectra as shown in FIG. 6. In such a case, the center wavelength is calculated regarding the envelope of the superposed spectra as one spectrum. Then, a light intensity that is B dB smaller than the peak of the light intensity at the center wavelength is defined, and the range of the light intensity or more is defined as the spectrum width. Using this spectrum width, the dispersion amount of the dispersion compensation optical fiber 106 is calculated by the method described in the first embodiment. In this case, for the spectrum on the long wavelength side (1342 nm in FIG. 6), the optical fiber 106 having a dispersion amount opposite to the dispersion amount received by the transmission optical fiber 109 may be calculated as described in the first embodiment.

Compensation for the transmission path loss due to the passage through the dispersion compensation optical fiber 106 (in FIG. 5, dispersion-shifted fiber: DSF) is the same as that of the first embodiment.

In this way, the optical transmission system 302 can cancel waveform distortion due to wavelength dispersion by extracting the spectrum of a transmitted optical signal and passing the optical signal through an optical fiber having a dispersion value opposite to a dispersion amount corresponding to a transmission distance received by the spectrum component and cancel a transmission path loss corresponding to the optical fiber by arranging optical splitters which are passive components and have different split configurations and different split ratios.

Third Embodiment

Figure 7:
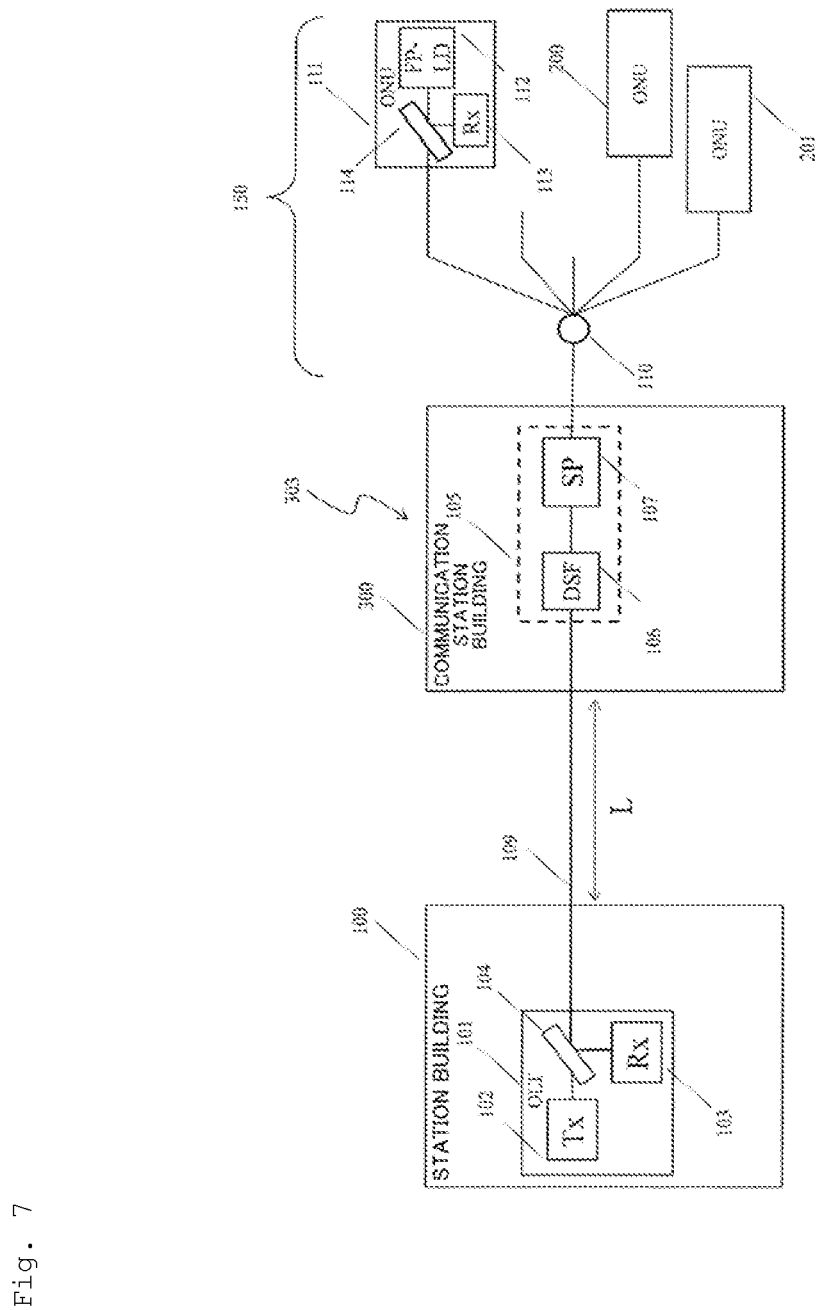
FIG. 7 is a diagram illustrating an optical communication system according to the present invention.

FIG. 7 is a diagram illustrating an optical communication system 303 of the present embodiment. In the optical communication system 303, the OLT 101 is connected to the merge port of the asymmetrical optical splitter 107 via the transmission optical fiber 109, and the optical network 150 is connected to the split port $P_{D1}$ to which one of the second ports T2 of the split portion 130-1 of the first stage of the split port $P_{Dn}$ of the asymmetrical optical splitter 107 is connected.

In FIG. 7, the optical network 150 is configured to connect the ONU 111 and the split port $P_{D1}$ of the asymmetrical optical splitter 107 via the symmetrical optical splitter 110, but the ONU 111 may be directly connected to the split port $P_{D1}$ of the asymmetrical optical splitter 107.

The difference between the optical communication system 303 and the optical communication system 301 of the first embodiment and the optical communication system 302 of the second embodiment is that the spectrum monitor 108 is eliminated and the dispersion compensation module 105 is installed in the communication station building 300. Such a situation may occur when the OLT in the communication station building 300 is integrated into the parent communication station building 100 in order to improve the accommodation rate.

As described above, the longer wavelength side than the zero-dispersion wavelength (about 1.31 μm) of SMF is called an anomalous dispersion region, and optical transmission in this region incurs waveform distortion due to wavelength dispersion. On the other hand, the shorter wavelength side than the zero-dispersion wavelength is called a normal dispersion region. It is known that the optical transmission in this region proceeds at a slow group velocity at the rising edge of a pulse and at a high group velocity at the falling edge of a pulse, resulting in pulse compression and improvement in transmission quality.

Therefore, the advantage of the optical communication system 303 is that the uplink transmission quality is improved using the pulse compression. That is, the optical communication system 303 does not cancel the waveform distortion due to wavelength dispersion via a dispersion compensation optical fiber having an opposite dispersion value equivalent to the dispersion amount corresponding to the transmission distance received by the spectrum component. The optical communication system 303 first passes an upstream optical signal from the ONU 111 through the optical fiber 106 so as to have a negative dispersion value, and then transmits the signal through the transmission optical fiber 109 so that the transmission quality is improved using pulse compression.

The fiber length (1 km) of the dispersion compensation optical fiber 106 can be calculated from the dispersion value on the longest wavelength side determined in the specifications and the length of the transmission optical fiber 109. Specifically, when the longest wavelength determined by the specifications is 1360 nm specified by IEEE802.3 standard, which is the standard of the GE-PON system, the dispersion value of SMF at that wavelength is 5 [ps/nm/km] from FIG. 4, and the dispersion value of the dispersion compensation optical fiber 106 (DSF) is −15 [ps/nm/km]. If the length of the transmission optical fiber 109 is L km, the fiber length can be uniquely determined by solving 5 [ps/nm/km]×L [km]=−15 [ps/nm/km]×1 [km]. For example, if L=20 km, then 1=6.7 km.

Compensating for the transmission path loss due to the insertion of the dispersion compensation optical fiber 106 using the asymmetrical optical splitter 107 is the same as that described in the first and second embodiments.

In this way, the optical transmission system 303 can cancel waveform distortion due to wavelength dispersion and improve the transmission quality due to a pulse compression effect by passing an optical signal through an optical fiber having a dispersion value opposite to a dispersion amount corresponding to a transmission distance received by a spectrum component on the longest wavelength side in a wavelength range of a transmission path and cancel a transmission path loss corresponding to the optical fiber by arranging optical splitters which are passive components and have different split configurations and different split ratios.

Other Embodiments

In the above embodiments, for the sake of simplicity, the asymmetrical optical splitter 107 having a 4-split configuration has been described, but the present invention is not limited to this configuration. A similar effect can be obtained with an N-split (N is an integer of 2 or more) asymmetrical optical splitter 207 as shown in FIG. 8. The N-split asymmetrical optical splitter 207 has a bead string configuration in which one of second ports T2 of an n-th split portion 130-n (n is an integer of 1 to N) is connected to one of first ports T1 of an (n+1)th split portion 130-n+1. With this configuration, the asymmetrical optical splitter 207 has a configuration in which the correspondence between the split portion 130 and the split port $P_D$ is uniquely determined.

Dispersion Compensation Method

In the method of the present invention, in order to compensate for the wavelength dispersion of a transmission optical fiber, the dispersion compensation module 105 is connected to the OLT 101 side or the ONU 111 side of the transmission optical fiber 109.

In the method of the present invention, the OLT 101 is connected to the merge port $P_{M1}$ of the asymmetrical optical splitter 107, one terminal of the transmission optical fiber 109 is connected to the split port $P_{D1}$ to which one of the second ports T2 of the split portion 130-1 of the first stage of the split ports $P_D$ of the asymmetrical optical splitter 107 is connected, and the other terminal of the transmission optical fiber 109 is connected to the optical network 150.

In this case, the spectrum monitor 108 may be connected to the other first port T1 of the split portion 130-1 of the first stage, and the spectrum of the uplink signal from the ONU 111 may be observed.

In the method of the present invention, the OLT 101 is connected to the merge port $P_{M1}$ of the asymmetrical optical splitter 107 via the transmission optical fiber 109, and the optical network 150 is connected to the split port $P_{D1}$ to which one of the second ports T2 of the split portion 130-1 of the first stage of the split port $P_D$ of the asymmetrical optical splitter 109 is connected.

The method of the present invention can compensate for waveform distortion due to wavelength dispersion by a simple method (passive component) in an access network and achieve an increase in the reachable transmission distance of the farthest user or an increase in the number of connectable users.

REFERENCE SIGNS LIST

100 Communication station building
101 OLT (Optical Line Terminal)
102 Optical transmitter that transmits downlink signals
103 Optical receiver that receives uplink signals
104 Transmission/reception separation filter for realizing single-core bidirectional communication
105 Dispersion compensation module
106 Dispersion compensation optical fiber
107, 207 Asymmetrical optical splitter
107R Symmetrical optical splitter
108 Spectrum monitor
109 Transmission optical fiber
110 N-split symmetrical optical splitter
111, 200, 201 ONU (Optical Network Unit)
112 Optical transmitter that transmits uplink signals
113 Optical receiver that receives downlink signals
114 Transmission/reception separation filter for realizing single-core bidirectional communication
116 Variable mechanism
119 Communication terminal
130, 130-1, ..., 130-n, ..., 130-N–1 Split portion
300 to 303 Optical communication system

The invention claimed is:

1. An optical communication system comprising:
a dispersion compensation module, the dispersion compensation module including:
a dispersion compensation optical fiber, the dispersion compensation optical fiber having a negative dispersion value in an anomalous dispersion region corresponding to a longer wavelength side than a zero-dispersion wavelength of a transmission optical fiber disposed between an OLT (Optical Line Terminal) and an ONU (Optical Network Unit); and
an asymmetrical optical splitter, the asymmetrical optical splitter including:
one merge port to which the dispersion compensation optical fiber is connected;
N split ports (N is an integer of 2 or more) to which an optical network including one or a plurality of the ONUs is connected; and
N–1 split portions that split light from two first ports on a side of the merge port to two second ports on a side of the split port at a predetermined split ratio,
wherein the split portions are connected so that one of the second ports is connected to one of the split ports and the other of the second ports is connected to one of the first ports of the split portion of a next stage, and
the split portion of a first stage of the split portions has one of the first ports connected to the merge port, and the split portion of a final stage has the second ports connected to the split port,
wherein the dispersion compensation optical fiber has a first wavelength dependence property in which a first dispersion value with respect to a peak wavelength at the other of the first ports of the split portion of the first stage is negative, and
the transmission optical fiber has a second wavelength dependence property in which a second dispersion value at the peak wavelength at the other of the first ports of the split portion of the first stage is positive.

2. The optical communication system according to claim 1, wherein
the OLT is connected to the merge port of the asymmetrical optical splitter,
one terminal of the transmission optical fiber is connected to the split port to which one of the second ports of the split portion of the first stage of the split ports of the asymmetrical optical splitter is connected, and
the other terminal of the transmission optical fiber is connected to the optical network.

3. The optical communication system according to claim 2, further comprising a spectrum monitor connected to the other of the first ports of the split portion of the first stage to observe a spectrum of an uplink signal from the ONU.

4. The optical communication system according to claim 1, wherein
the OLT is connected to the merge port of the asymmetrical optical splitter via the transmission optical fiber, and
the optical network is connected to the split port to which one of the second ports of the split portion of the first stage of the split ports of the asymmetrical optical splitter is connected.

5. The optical communication system according to claim 1, wherein
the dispersion compensation optical fiber has negative dispersion values with respect to an entirety of a wavelength range of 1280 nm to 1360 nm, and
the transmission optical fiber has positive dispersion values with respect to some wavelengths in the wavelength range of 1280 nm to 1360 nm.

6. The optical communication system according to claim 1, wherein
the OLT is connected to the merge port of the asymmetrical optical splitter via the dispersion compensation optical fiber,
one terminal of the transmission optical fiber is connected to the split port to which one of the second ports of the split portion of the first stage of the split ports of the asymmetrical optical splitter is connected,
the other terminal of the transmission optical fiber is connected to the optical network,
the ONU has a Fabry Perot laser diode to transmit an uplink signal,
the dispersion compensation optical fiber has negative dispersion values with respect to an entirety of an oscillation spectrum of the Fabry Perot laser diode, and
the transmission optical fiber has positive dispersion values with respect to some wavelengths of the oscillation spectrum of the Fabry Perot laser diode.

7. The optical communication system according to claim 6, wherein
the predetermined split ratio of the asymmetrical optical splitter with respect to the split portion of the first stage is more than 50%.

8. A dispersion compensation method for compensating for wavelength dispersion of a transmission optical fiber disposed between an OLT (Optical Line Terminal) and an ONU (Optical Network Unit), comprising:
 connecting a dispersion compensation module to a side of the OLT or a side of the ONU of the transmission optical fiber, wherein
 the dispersion compensation module includes:
  a dispersion compensation optical fiber, the dispersion compensation optical fiber has a negative dispersion value in an anomalous dispersion region corresponding to a longer wavelength side than a zero-dispersion wavelength of the transmission optical fiber disposed between the OLT and the ONU; and
  an asymmetrical optical splitter, the asymmetrical optical splitter includes:
   one merge port to which the dispersion compensation optical fiber is connected;
   N split ports (N is an integer of 2 or more) to which an optical network including one or a plurality of the ONUs is connected; and
   N−1 split portions that split light from two first ports on a side of the merge port to two second ports on a side of the split port at a predetermined split ratio,
   wherein the split portions are connected so that one of the second ports is connected to one of the split ports and the other of the second ports is connected to one of the first ports of the split portion of a next stage, and
   the split portion of a first stage of the split portions has one of the first ports connected to the merge port, and the split portion of a final stage has the second ports connected to the split port,
  wherein the dispersion compensation optical fiber has a first wavelength dependence property in which a first dispersion value with respect to a peak wavelength at the other of the first ports of the split portion of the first stage is negative, and
  the transmission optical fiber has a second wavelength dependence property in which a second dispersion value at the peak wavelength at the other of the first ports of the split portion of the first stage is positive.

9. The dispersion compensation method according to claim 8, wherein
 the OLT is connected to the merge port of the asymmetrical optical splitter,
 one terminal of the transmission optical fiber is connected to the split port to which one of the second ports of the split portion of the first stage of the split ports of the asymmetrical optical splitter is connected, and
 the other terminal of the transmission optical fiber is connected to the optical network.

10. The dispersion compensation method according to claim 9, further comprising connecting a spectrum monitor to the other of the first ports of the split portion of the first stage to observe a spectrum of an uplink signal from the ONU.

11. The dispersion compensation method according to claim 8, wherein
 the OLT is connected to the merge port of the asymmetrical optical splitter via the transmission optical fiber, and
 the optical network is connected to the split port to which one of the second ports of the split portion of the first stage of the split ports of the asymmetrical optical splitter is connected.

12. The dispersion compensation method according to claim 8, wherein
 the dispersion compensation optical fiber has negative dispersion values with respect to an entirety of a wavelength range of 1280 nm to 1360 nm, and
 the transmission optical fiber has positive dispersion values with respect to some wavelengths in the wavelength range of 1280 nm to 1360 nm.

13. The dispersion compensation method according to claim 8, wherein
 the OLT is connected to the merge port of the asymmetrical optical splitter via the dispersion compensation optical fiber,
 one terminal of the transmission optical fiber is connected to the split port to which one of the second ports of the split portion of the first stage of the split ports of the asymmetrical optical splitter is connected,
 the other terminal of the transmission optical fiber is connected to the optical network,
 the ONU has a Fabry Perot laser diode to transmit an uplink signal,
 the dispersion compensation optical fiber has negative dispersion values with respect to an entirety of an oscillation spectrum of the Fabry Perot laser diode, and
 the transmission optical fiber has positive dispersion values with respect to some wavelengths of the oscillation spectrum of the Fabry Perot laser diode.

14. The dispersion compensation method according to claim 13, wherein
 the predetermined split ratio of the asymmetrical optical splitter with respect to the split portion of the first stage is more than 50%.

* * * * *